United States Patent [19]

Strock et al.

[11] Patent Number: 5,112,191
[45] Date of Patent: May 12, 1992

[54] ROTATING COWLING

[75] Inventors: William J. Strock, Cincinnati, Ohio; Thomas G. Wakeman, Lawrenceburg, Ind.; Ambrose A. Hauser, Cincinnati, Ohio

[73] Assignee: General Electric Company, Cincinnati, Ohio

[21] Appl. No.: 336,375

[22] Filed: Apr. 11, 1989

[51] Int. Cl.⁵ .................. B64C 11/14; B64C 27/00
[52] U.S. Cl. .................... 416/94; 416/129; 416/244 A
[58] Field of Search .............. 416/94, 127, 128, 129, 416/147, 148, 155, 156, 158, 159, 160, 157 R, 93 R, 94, 120, 140, 146 A, 154, 244 A, 245 R; 60/39.162, 226.1, 268; 244/53 R, 62, 65

[56] References Cited

U.S. PATENT DOCUMENTS

| | | | |
|---|---|---|---|
| 2,174,762 | 11/1986 | Johnson | 416/127 |
| 2,410,804 | 11/1946 | Baumann | 416/126 |
| 2,478,206 | 8/1949 | Redding | 60/35.6 |
| 2,541,098 | 2/1951 | Redding | 170/135.7 |
| 2,745,501 | 5/1956 | Blanchard, Jr. et al. | 170/160.23 |
| 3,811,791 | 5/1974 | Cotton | 416/129 |
| 3,876,331 | 9/1975 | Denherder et al. | 416/214 |
| 4,086,761 | 5/1978 | Schaut et al. | 60/226.1 |
| 4,488,399 | 12/1984 | Robey et al. | 416/94 |
| 4,621,978 | 11/1986 | Stuart | 416/127 |
| 4,657,484 | 4/1987 | Wakeman et al. | 416/127 |
| 4,732,538 | 3/1988 | Wollenweber | 416/94 |
| 4,738,590 | 4/1988 | Butler | 416/129 |
| 4,738,591 | 4/1988 | Butler | 416/129 |
| 4,789,304 | 12/1988 | Gustafson et al. | 416/127 |
| 4,809,498 | 3/1989 | Giffin, III et al. | 60/39.162 |
| 4,817,382 | 4/1989 | Rudolph et al. | 60/268 |
| 4,864,820 | 9/1989 | Wynosky et al. | 60/226.1 |
| 4,916,892 | 4/1990 | Pope | 416/129 |

FOREIGN PATENT DOCUMENTS

| | | |
|---|---|---|
| 0059433 | 2/1982 | European Pat. Off. . |
| 0059585 | 8/1982 | European Pat. Off. . |
| 2333245 | 6/1977 | France . |
| 0542422 | 1/1942 | United Kingdom . |
| 774502 | 7/1954 | United Kingdom . |
| 1079264 | 6/1965 | United Kingdom . |
| 2167136 | 5/1986 | United Kingdom . |
| 2180009 | 3/1987 | United Kingdom ......... 416/94 |

Primary Examiner—Edward K. Look
Assistant Examiner—Hoang Nguyen
Attorney, Agent, or Firm—Jerome C. Squillaro; John R. Rafter

[57] ABSTRACT

The invention concerns a cowling for aircraft propulsion systems of the counterrotating propeller type. The cowling includes a pair of mounting rings located fore and aft of a propeller array. Removable panels extend between the mounting rings and contain openings through which the propeller blades extend.

7 Claims, 8 Drawing Sheets

_Fig-1_

_Fig-2_

ROTATING COWLING

The invention herein described was made in the performance of work under a NASA contract and is subject to the provisions of Section 305 of the National Aeronautics and Space Act of 1958, Public Law 85-568 (72 Stat. 435; 42 USC 2457).

The invention relates to nacelles for gas turbine aircraft engines and, particularly, to cowls for contrarotating fans.

BACKGROUND OF THE INVENTION

Figure 1:
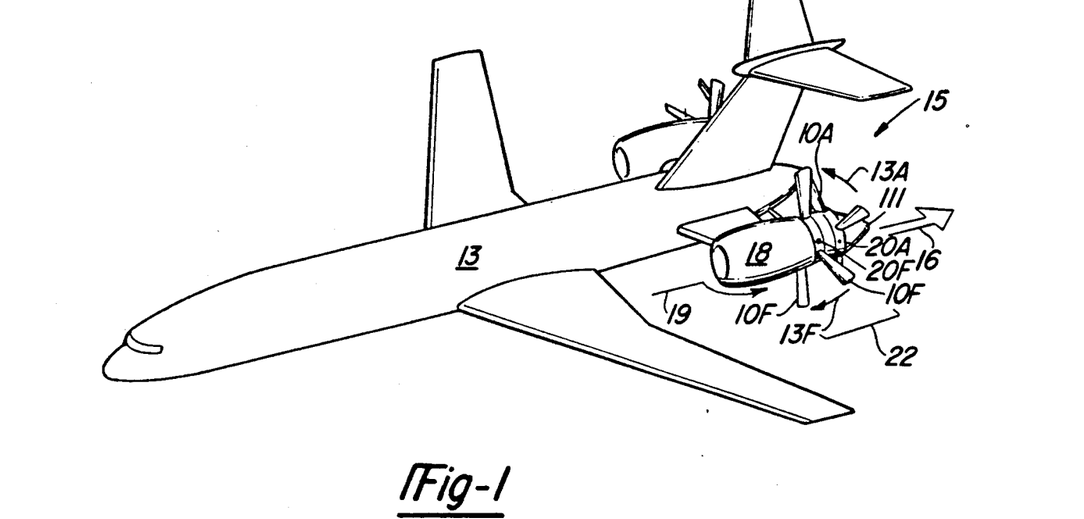
FIG. 1 illustrates an aircraft powered by counterrotating unducted fans with which the invention can be used.

FIG. 1 illustrates an aircraft 13 and a propulsion system 15 with which the invention may be used. Two sets of fan blades 10A and 10F rotate in opposite directions as indicated by arrows 13A and 13F, providing thrust, indicated by arrow 16. A nacelle 18 surrounds the engine (not shown) and defines a flow path along which freestream air 19 travels during flight. Rotating nacelle sub-regions (or cowls) 20A and 20F define the flow paths near fan blade roots.

Figure 2:
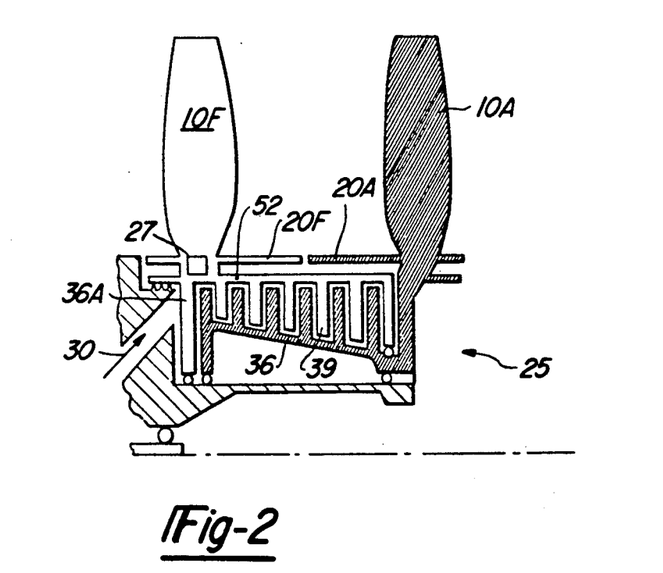
FIG. 2 illustrates in schematic form a counterrotating turbine for driving the unducted fans.

A schematic cross section of region 22 is shown in FIG. 2. This region contains rotating turbo machinery 25 located within cowls 20A and 20F. It is desirable that maintenance personnel have easy access to the machinery contained within cowls 20A and 20F, such as fan blade mounts indicated as 27 (not shown in detail).

OBJECTS OF THE INVENTION

It is an object of the present invention to provide an improved aircraft engine nacelle.

It is a further object of the present invention to provide a rotating cowling for use with a fan-powered aircraft engine.

DETAILED DESCRIPTION OF THE INVENTION

Introduction

Figure 3:
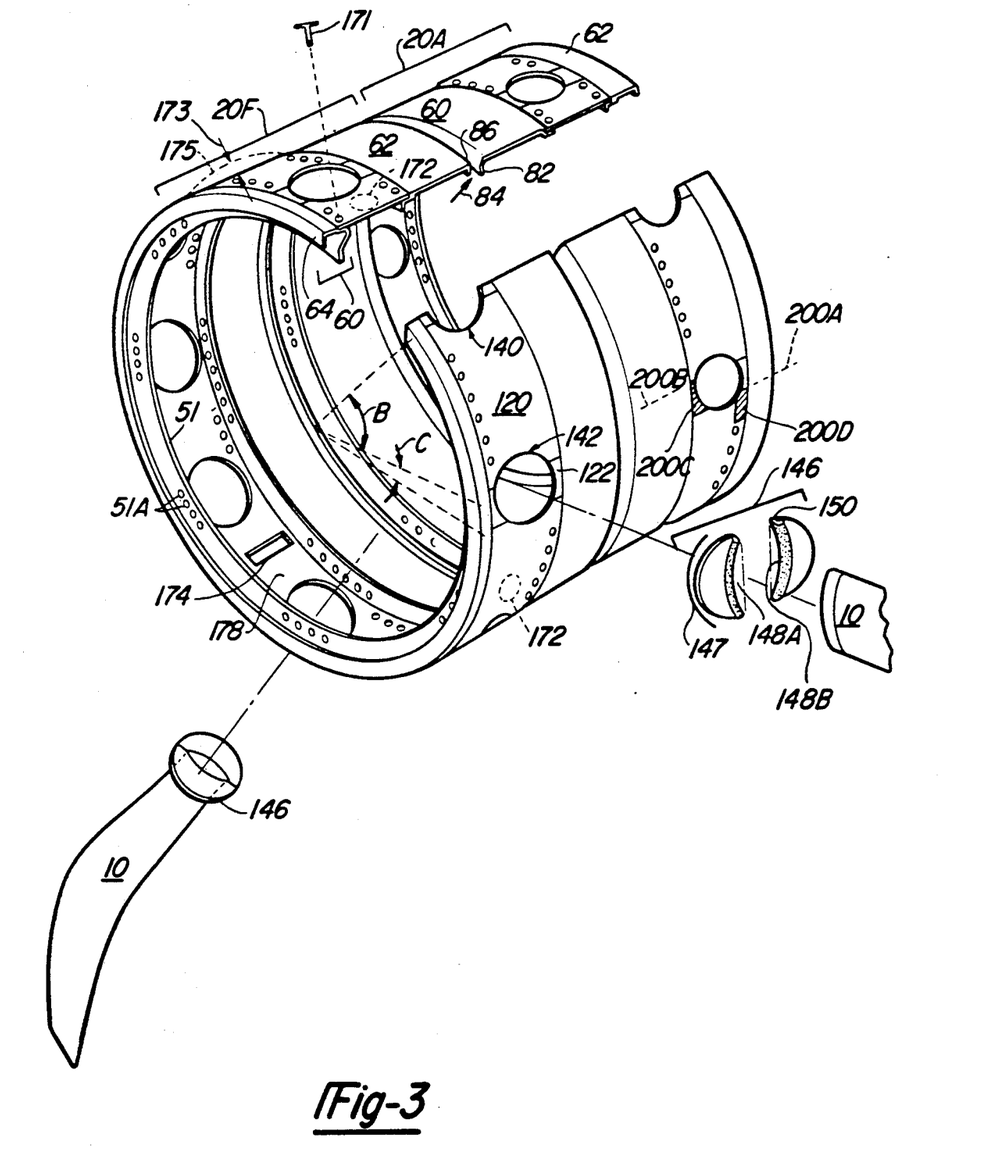
FIG. 3 illustrates one form of the invention.
Figure 7:
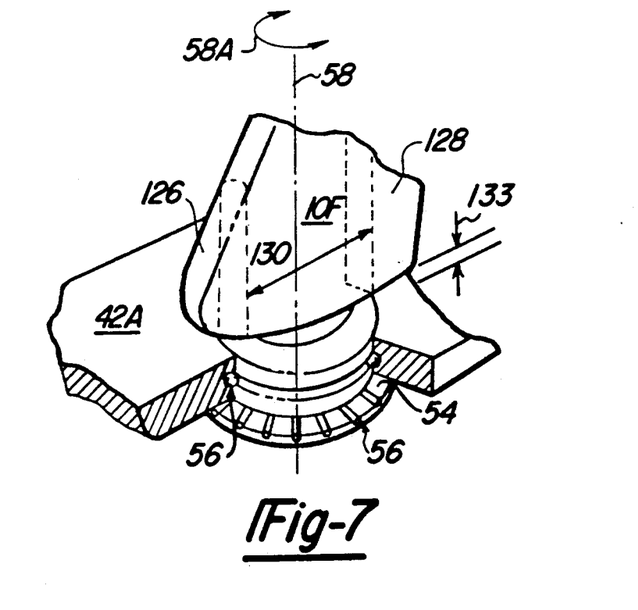
FIG. 7 illustrates one of the sectors of the polygonal ring which supports a fan blade.

One form of the invention is shown in FIG. 3. Cowlings 20A and 20F (shown schematically in FIGS. 1 and 2) surround the contra-rotating turbo machinery 25 shown in FIG. 2. The turbo machinery 25 in FIG. 2 receives high-energy gases 30 provided by a gas generator (not shown) which rotates turbines 36 and 39 in opposite directions. Each turbine drives a respective fan 10A or 10F. The fans are not directly fastened to the turbine, as shown in FIG. 2, but are each fastened to an intermediate polygonal ring, shown schematically as ring 42 in FIG. 5 and ring 42A in FIG. 7. Cowls 20A in FIG. 3 and 20F in FIG. 7 are also fastened to ring 42. The following discussion will describe (1) the polygonal rings which support both the fan blades 10 and the cowls 20; (2) the mounting rings which act as the attachment points between the cowls and the polygonal rings; and (3) the panels which span between the mounting rings and form the surface of the cowl along with the mounting rings.

Polygonal Rings

Figure 4:
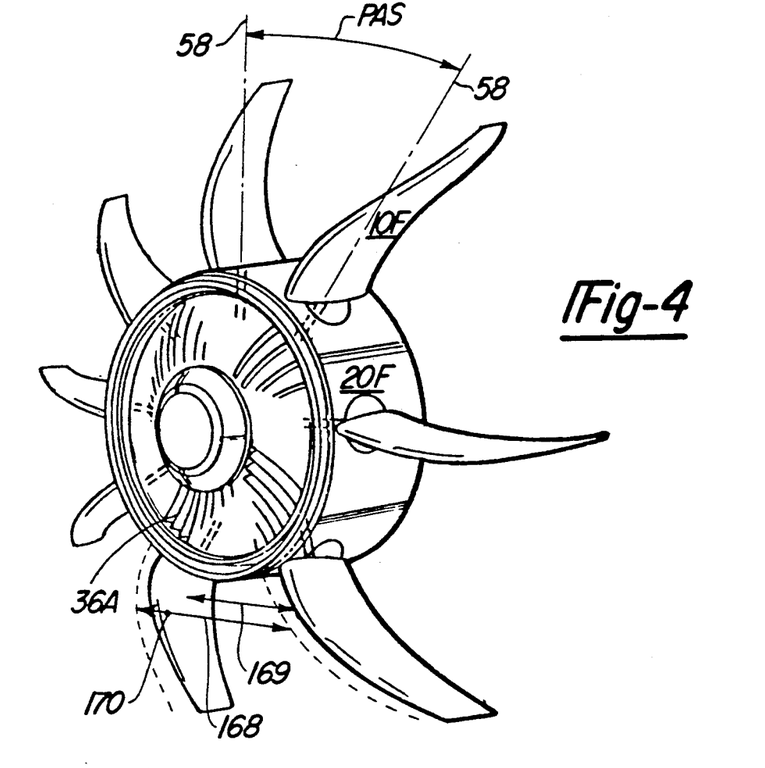
FIG. 4 illustrates one of the turbine stages in the turbine shown in FIG. 2.

FIG. 4 shows the turbine stage 36A in FIG. 2, together with fan blades 10F and cowl region 20F in FIGS. 1 and 3. This stage 36A is shown in greater detail in FIG. 5, which shows schematically a ring 42 which supports the fan blades 10F. The fan blades 10F are carried by the ring 42, rather than connected directly to the turbine 36A, for at least two reasons.

One reason is that different design considerations apply to internal, turbine components, as compared to external, fan components because fans and turbines serve different purposes. For example, a new turbine may be designed which is smaller than a previous turbine, yet drives the same fan blades. The use of ring 42 in Figure as an intermediate component reduces the impact of the turbine change upon the fan: the new turbine need only be mounted to the ring 42, and the fan need not be modified.

A second reason is that the use of the ring 42 and bracket 50 decouples thermal growth of the turbine casing 2 from the fan blades 10. The casing 52 (to which turbine blades 53 are attached) can expand with increasing temperature, while supporting the ring 42, yet without unduly stressing the ring, because bracket 50 deforms: legs 52A and 52B separate from each other. That is, the deformation provides a type of floating mount of the ring 42 upon the casing 52.

Figure 5:
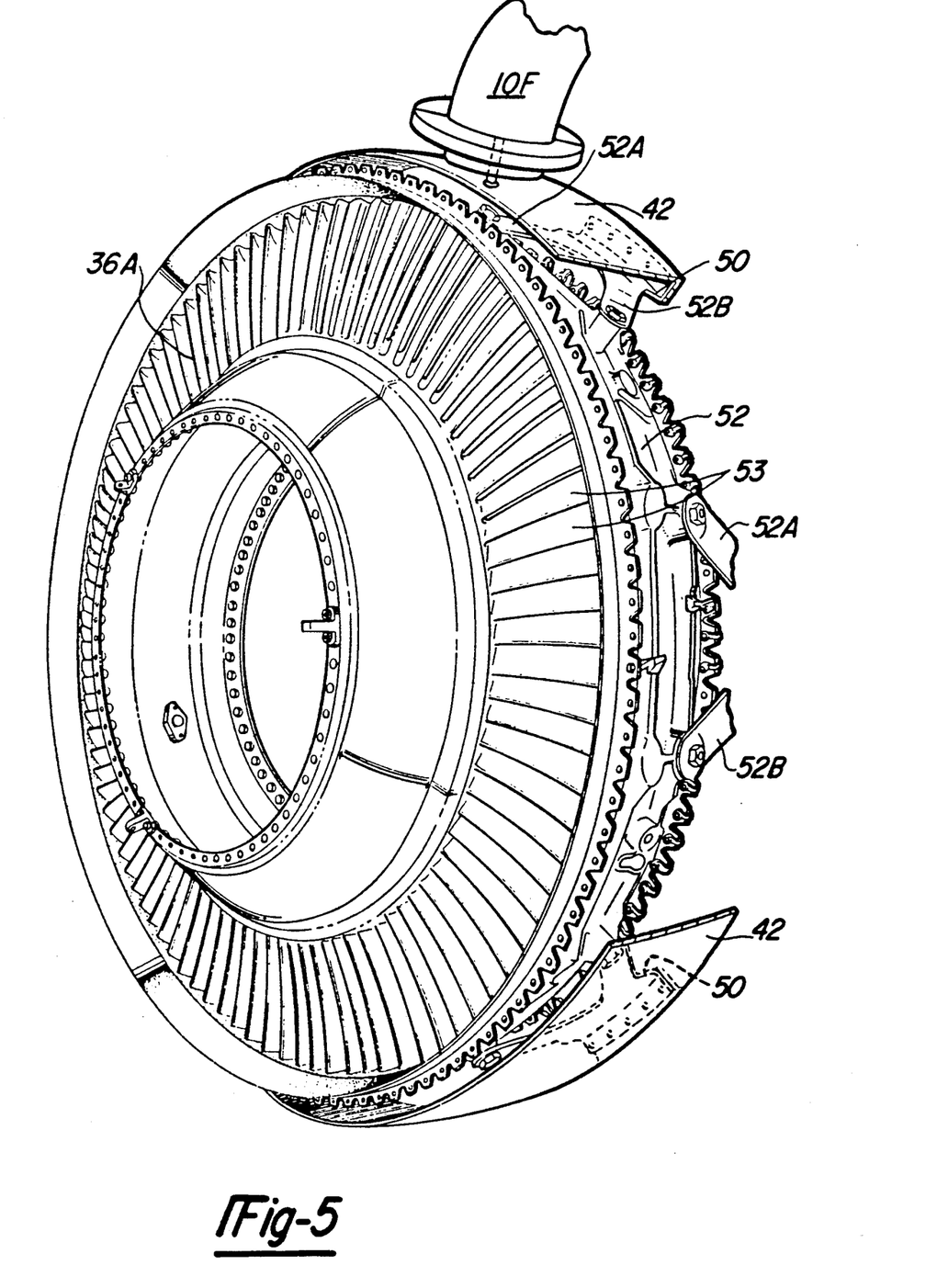
FIG. 5 illustrates the turbine stage of FIG. 4 in more detail.
Figure 6:
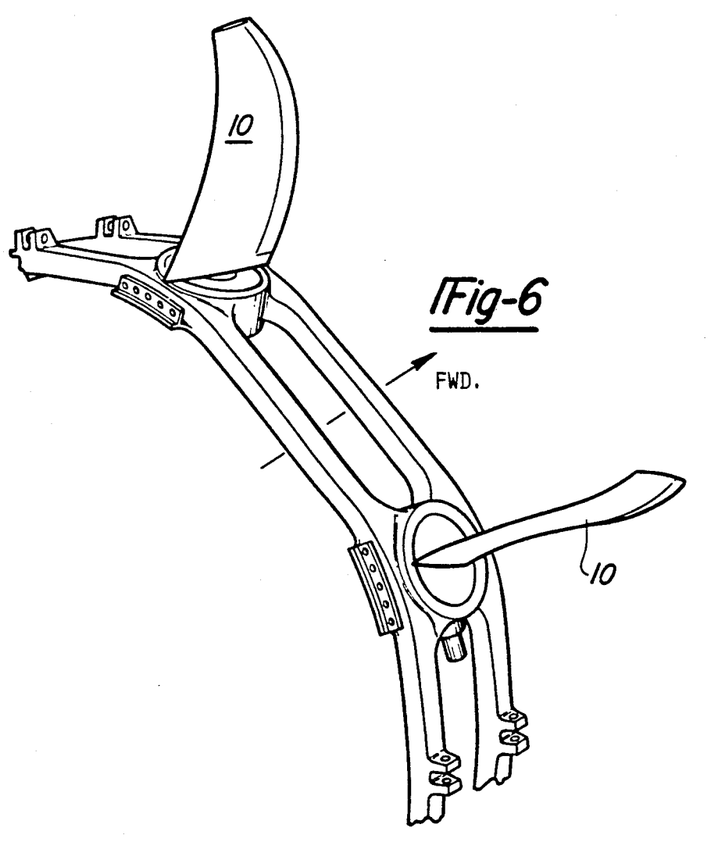
FIG. 6 illustrates a polygonal ring which supports the fan blades.

The ring 42 does not actually take the form of the hoop shown in FIG. 5, but more resembles the polygonal ring shown in FIG. 6. Some sectors 42A of the ring 42 contain bearing races 54 and bearings 56 in FIG. 7 which react the centrifugal load imposed by the fan blades 10F, and allow blade rotation about pitch axis 58 in order to change pitch, as indicated by arrow 58A.

Each polygonal ring is mounted to the casing 52 of the turbine stage 36A by brackets 50 in FIG. 5. Details concerning the construction of one type of polygonal ring are found in the U. S. Patent Application "Blade Carrying Means", filed by Hauser, Strock, Morris & Wakeman on Nov. 2, 1984, and having Serial Number 667,663. This application is hereby incorporated by reference.

Mounting Rings

Figure 7A:
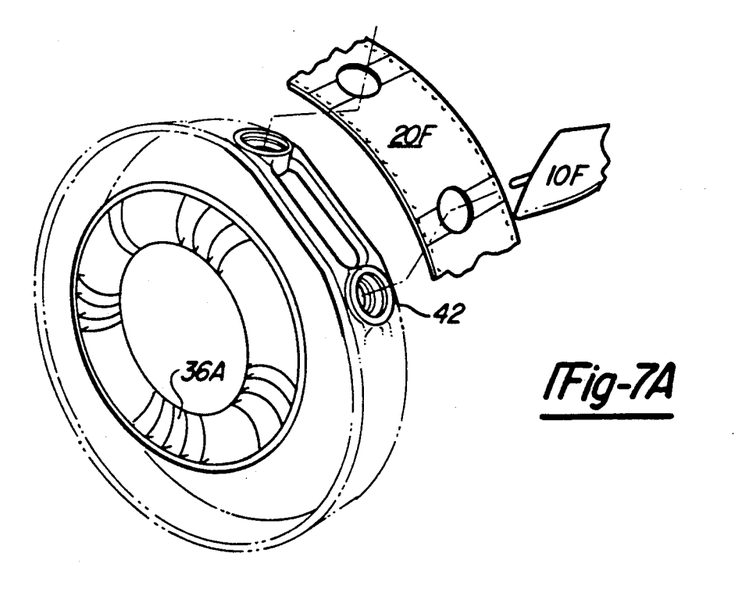
FIG. 7A illustrates the relative positioning of the turbine stage 36A, the polygonal ring 42 and the cowling 20F.

Each polygonal ring supports a forward and an aft mounting ring 60 and 62 in FIG. 3. FIG. 7A shows the relationship between the turbine stage 36A, the polygonal ring 42 and the cowling 20F. Brackets 50 (shown in FIG. 5) connect the ring 42 to the turbine casing 52. Other brackets, in the form of flange 51 in FIG. 3, connect the cowl 20F to the ring 42. Bolts extend through holes 51A to make the connection.

Figure 9:
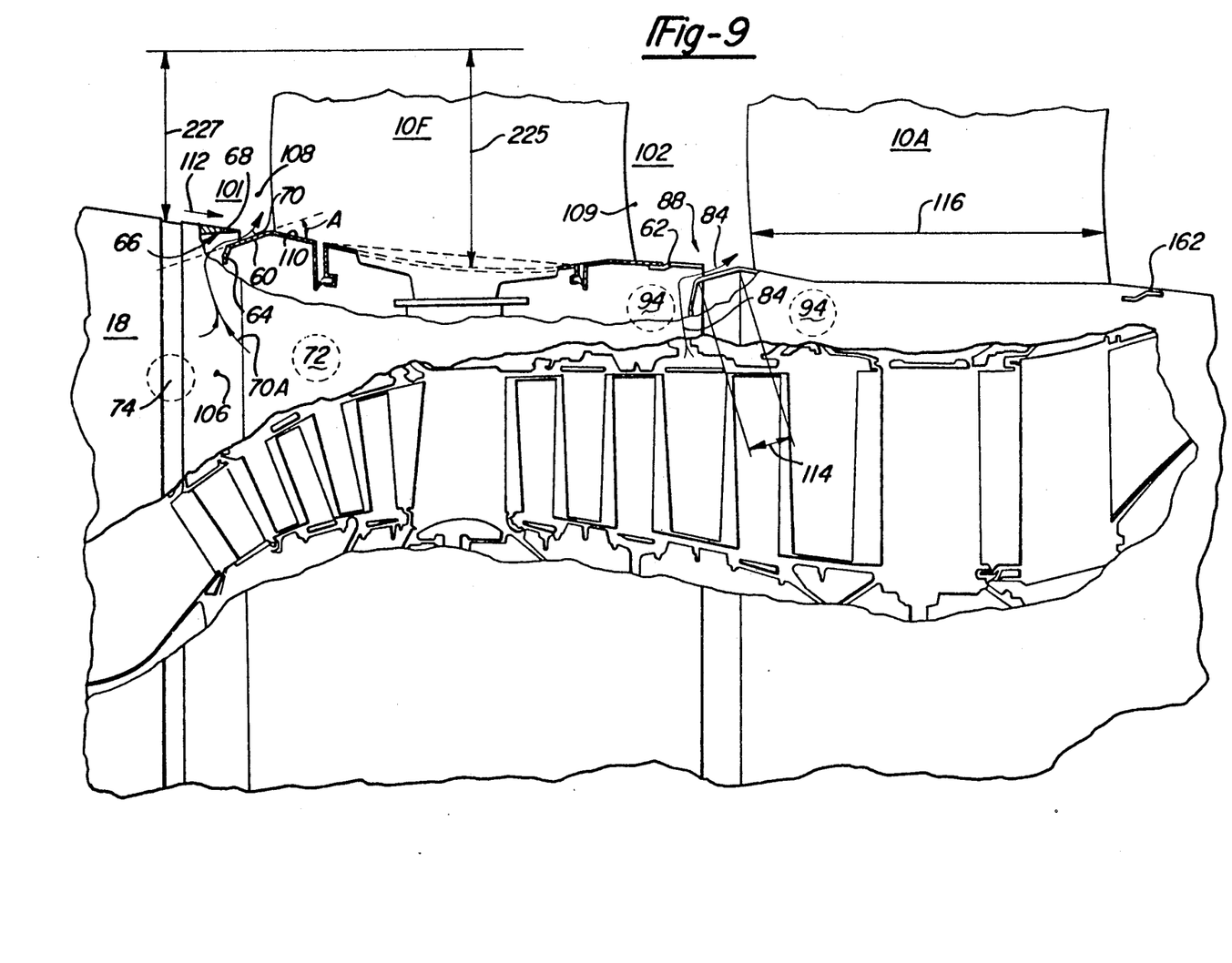
FIG. 9 is a more detailed cross-section of the type shown in FIG. 2.

As shown in FIGS. 3 and 9, the forward mounting ring 60 contains a flange 64 near the inner surface 66 of the trailing edge 68 of nacelle 18. An annular channel 70, shown as an arrow in FIG. 9, is thereby formed which communicates with either or both (1) cavity 72 within the cowling 20F and (2) the interior region 74 of the nacelle 18.

Similarly, as shown in FIG. 3, the forward mounting ring 60 of the aft cowl 20A has a flange 82. This flange 82, in conjunction with the inner surface 86 of the trailing edge 88 of the aft mounting ring 62 of the forward cowl 20F, defines a channel 84. Thus, a second annular channel 84 communicates between cavity 94 and the external space 102 between fore and aft fan rotors 10F and 10A.

The flowpaths 70 and 84 allow ventilation of cavities 72 and 94 for cooling purposes, and for purging flammable vapors such as those emanating from lubricants. These cavities are maintained at higher pressures than external regions 101 and 102, in a manner known in the art, and so cooling air flows outward from the cavities as indicated by flowpath arrows 70 and 84. However, such cooling is not necessary in all situations, nor in all flight conditions.

Two important features of the flanges 64 and 82 in FIG. 9 are the following: One, the angle A which each flange makes with the cowl surface 110 should not exceed fifteen degrees. This angle constrains the flowpaths 70 and 84 to be nearly parallel with (or at least within 15 degrees of) the fanstream flow, indicated by arrow 112, to thereby promote mixing with reduced turbulence. It is desirable that the fans ingest air having as little turbulence as possible.

A second feature of flanges 60 in FIG. 9 is that their length, dimension 114, should not exceed twenty percent of the chord length 116 of the respective fan blade into which the flange directs air. One reason is that, in general, the boundary layer (not shown) of flow across a surface tends to increase in thickness in the downstream direction. Eventually, the boundary layer becomes turbulent. The twenty percent limit either (1) reduces the likelihood of delivering a turbulent boundary layer to a fan, or (2) prevents a thick boundary layer from entering a fan, or both. There is no flowpath downstream of aft fan 10A analogous to flowpath 84. Instead, the aft frame 62 of the aft cowl 20A supports a faired structure 111 in FIG. 1 which rotates along with aft fan and also defines the inner fan flow path and outer flowpath of the turbine.

Panels

In addition to defining the ventilation flow paths just described, the pairs of mounting rings 60 and 62 in FIG. 3 also support cowl panels 120, as will now be described. The panels define the fan flow path between the fan blades. For eight panels in FIG. 3 between eight fan blades, each panel 120 spans an arc (angle B) of approximately forty degrees. Other, filler panels 122 each span about five degrees (angle C). The reason each access panel does not span a full forty-five degree arc (360/8=45) is the difficulty that this would cause for panel removal.

Figure 8:
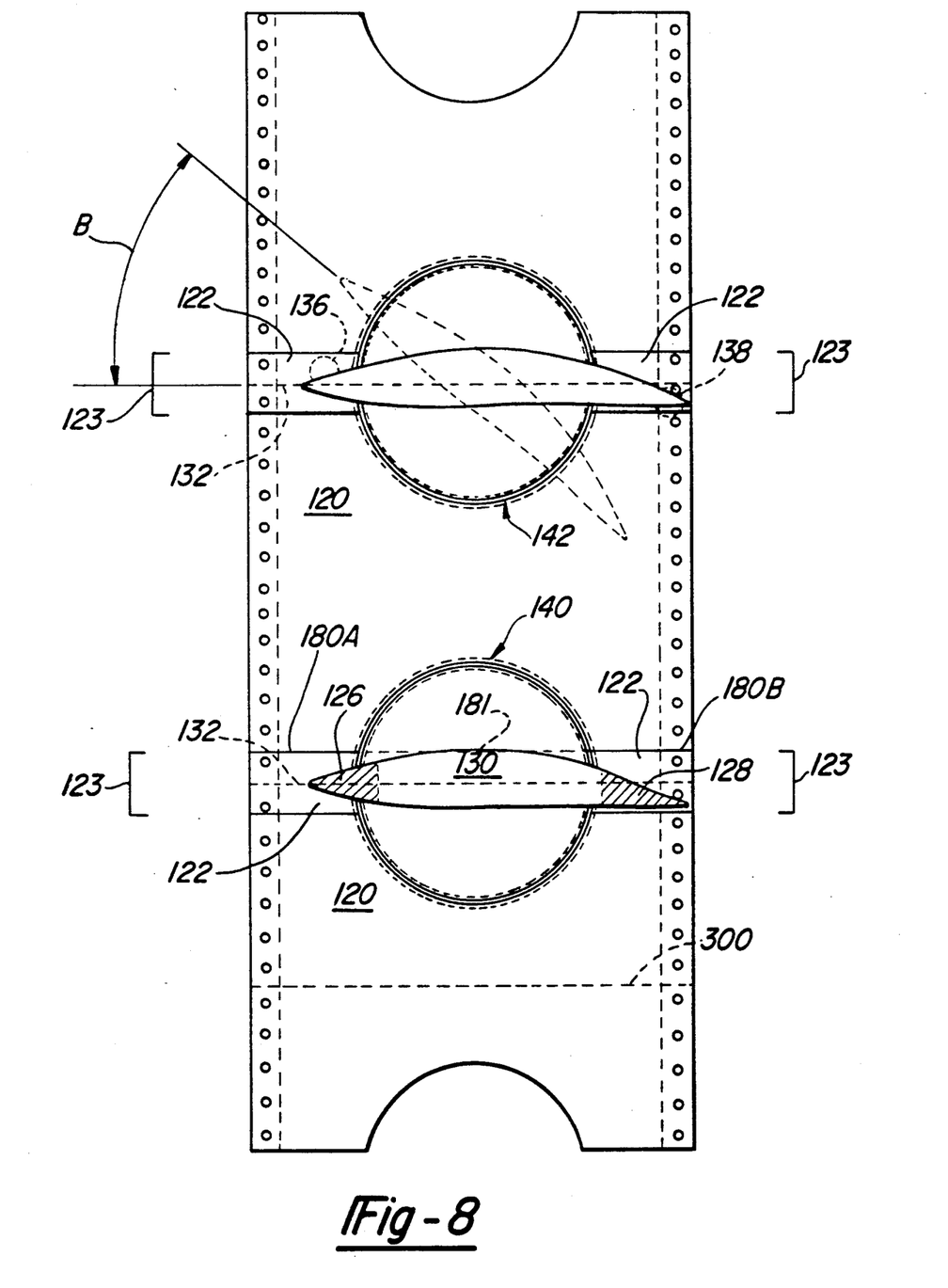
FIG. 8 illustrates a top view of one of the cowlings.

That is, if an access panel 120 extended a full forty-five degrees, then the fan blade 10 would obstruct removal of the access panel. As shown in FIGS. 7 and 8, each fan blade 10 has fore and aft cuffs 126 and 128. The blade cuffs overhang the panels 120 in FIG. 8, while the central region 130 of the blade lies above a platform (later discussed), not above the panels.

Dashed line 132 indicates the interface which would exist between adjacent panels 120 in the absence of filler panels 122. That is, dashed lines 132 indicates that each panel 120 spans 45 degrees of arc. The cuffs make it difficult to remove the panels because the clearance 133 in FIG. 7 is of the order of ¼ or ⅛ inch. Further, as shown in FIG. 8, no matter what pitch angle B the fan blade 10 has, part 136 of one panel 120 and another part 138 of a neighboring panel 120 will lie beneath the cuffs. Clearly, with the situation just described, it is difficult to lift panel 120 outward, in the direction perpendicular to the paper.

One solution is to construct the panels to span less than one pitch axis separation. (Pitch axis is the axis 58 in FIG. 4 about which a fan blade rotates in changing pitch. Pitch axis separation is the angular distance PAS, in degrees or equivalent, between neighboring pitch axes.) This solution is shown in FIG. 8, wherein filler panels 122 replace the ends of panels 120 in regions 123.

One removes a panel 120 in FIG. 8 by positioning the fan blade so that the cuffs lie above the filler panels 122, as shown. One removes one or more panels 120, and then one removes the filler panels 122, perhaps after changing blade pitch to increase clearance for the removal of filler panels.

Each panel 120 in FIGS. 3 and 8 contains two semi-circular cutouts 140 and 142. As shown in FIG. 3, each cutout mates with a circular fan blade platform 146, also shown in FIG. 10. The periphery of the platform 146 bears a resilient seal 147 which seals the interface between the platform and the circle defined by cutouts 140 and 142.

Figure 10:
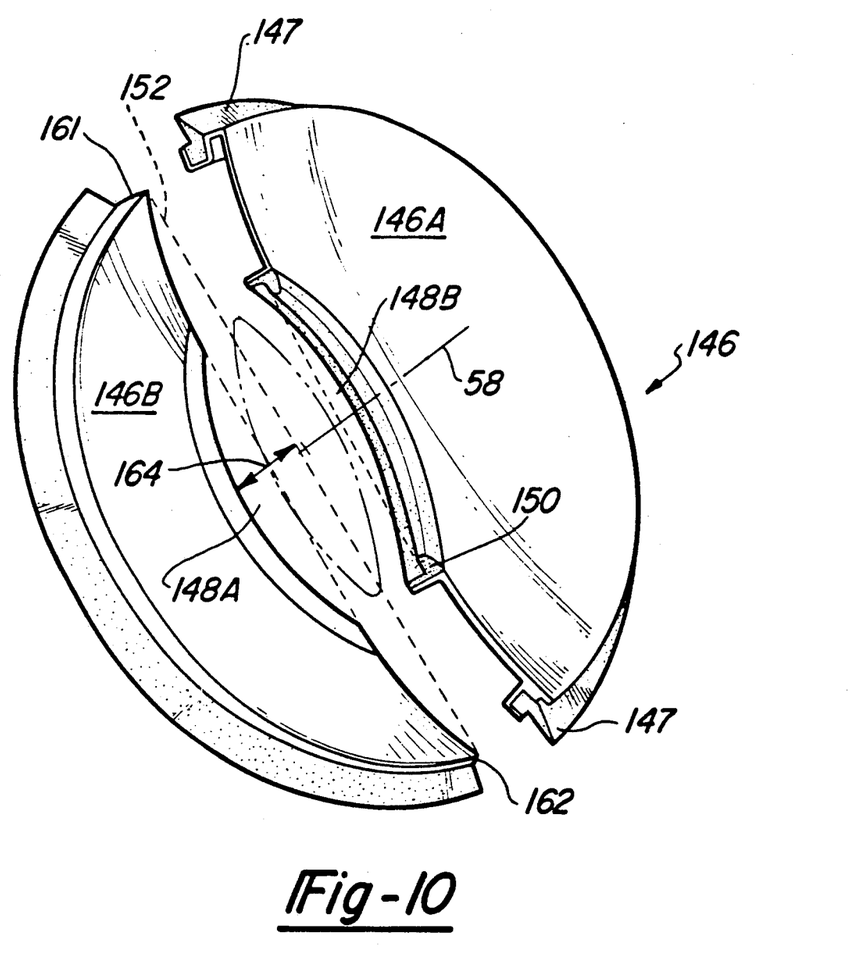
FIG. 10 illustrates one of the propeller blade platforms.

When the platform cowl system is assembled, virtually all of the air within cavities 72, 74 and 94 in FIG. 9 is forced to exit through channels 70 and 84 rather than through the interface sealed by seal 147 in FIG. 10 between the platform and panel.

As shown in FIG. 10, platform 146 is slightly concave. That is, if a straight line 152 were drawn between the leading edge 161, and the trailing edge 162 of fan blade 10, a distance 164 would exist between the platform and the straight line near mid-chord. This concavity 164 allows a small diffusion of air to occur in order to reduce the tendency of the space between adjacent fan blades to behave as a nozzle. That is, as shown in FIG. 4, distance 168 (which is the distance between two imaginary lines located directly in front of the leading edges of neighboring fan blades 10) is greater than distance 169 (which is the distance between facing surfaces of neighboring blades), thus forcing air at point 170 to accelerate in passing between fan blades.

Several important features of the invention are the following:

1. As shown in FIG. 3, the access panels are mounted by bolts 171 to mounting rings 60 and 62 along the fore F and aft A edges of the panels. The center regions 172 are unsupported. In operation, centrifugal loading causes the center regions 172 to bulge outward as shown by phantom line 175 in FIG. 3. A bow of 1/10 inch (dimension 173) has been measured by the inventors. This tendency to bow is countered by the installation of stiffening ribs 174, which reduce bowing. Alternately, a stiffening layer of a honeycomb material (not shown) can be installed on the inner surface 178 of access panels 120. In addition, panels of narrow cross section can require stiffening for acoustic reasons.

2. Eight fan blades per cowl have been discussed. It is, of course, recognized that the number 8 is not critical, nor is it critical that an equal number be associated with each cowling.

3. The access panels shown have ends 180A and 180B in FIG. 8 which terminate at approximately the same position on fore and aft mounting rings 60 and 62, as indicated by phantom line 181. However, this is not necessary. For example, as shown in FIG. 3, ends 200A and 200B on the aft cowl can terminate at the positions shown. Appropriate filler panels, such as 200C and 200D, shown notched, are then used. Restated, the relative positions of filler panels 122 dictate the pitch angle B at which the blade must be set in order for removal of access panels 120.

4. The access panels, such as panel 120 in FIG. 8, can be split into two parts by a seam 130. This splitting can further facilitate removal of the panels from beneath the blades 10. The panel region near the seam 130 can be first raised, and then the panel can be slid out from under a blade.

An invention has been described wherein a counterrotating propeller pair surrounds a counterrotating turbine pair which drives the propellers. The propellers are not connected directly to the respective turbines, but each is connected to a polygonal ring which surrounds and is fastened to one of the turbines.

A rotating cowl is connected to each polygonal ring and defines the propeller flowpath. Each cowl includes (a) a pair of annular mounting rings and (b) several panels extending between the mounting rings and defining the flowpath shape. Further, there is an annular channel near the upstream ring of each pair which assists in ventilation of the space contained within each cowl. The ventilation air 70 in FIG. 9 exhausts into the propeller airstream 112.

The panels contain cutouts so that, when assembled, the panels resemble cylinders with a series of circular holes perforating the surface. The holes are to contain circular blade platforms which rotate along with the blades during pitch change. A resilient seal is positioned between the edge of the circular platform and the circular hole in the panels into which the platform fits.

Each platform contains a concavity which has the effect of increasing the annular height of the flowpath above the concavity. That is, the height 225 in FIG. 9 is greater than height 227. The increase in height decreases the tendency of air to accelerate through the channels defined by neighboring fan blades.

The terms "fan" and "propeller" have been used in the discussion above. It should be understood that, in the present context, there is no difference in ultimate function between the two: both of them provide thrust to an aircraft by imparting a momentum change to ambient air. While it is true that fans and propellers are generally viewed as having different characteristics, as respects, for example, (a) ducting or the lack of it, (b) the amount of pressure rise across the disc, (c) pitch change aspects, and (d) blade root diameter, it is not seen as critical whether the thrust-providing device is called a fan or propeller in the present invention.

Numerous substitutions and modifications can be undertaken without departing from the true spirit and scope of the invention as defined in the following claims:

What is claimed is:

1. An aircraft propulsion system comprising:
   a) an intermediate polygonal ring, of integral construction, around a turbine fastened for rotation therewith;
   b) a radial array of propeller blades attached to and supported by the ring and coupled thereby to said turbine said blades being located in a propeller airstream;
   c) a rotatable cowling, through which the propeller blades extend, supported by the ring, which in turn is mounted to the turbine with deformable brackets comprising two legs for separating in response to relative thermal growth between the ring and the turbine whereby a floating mount of the ring upon the turbine is established without unduly stressing the ring; and
   d) means for exhausting ventilation air from a region interior of said cowling into the propeller airstream, upstream of the propeller blades, at a discharge angle relative to the cowling of not greater than fifteen degrees in order to promote mixing with reduced turbulence.

2. An aircraft propulsion system comprising:
   a) an intermediate ring integral construction around and coupled to a turbine;
   b) an annular, rotatable cowl supported by the ring;
   c) a radial array of unducted propeller blades, of the variable pitch type, attached to the ring extending through the cowl and located in a propeller airstream;
   d) an annular flowpath defined between an upstream part of the cowl and a non-rotating body for venting gases from within the cowl including means for exhausting ventilation air from a region interior of said cowling into the propeller airstream, upstream of the propeller blades, at a discharge angle relative to the cowling of not greater than fifteen degrees in order to promote mixing with reduced turbulence.

3. An aircraft propulsion system comprising:
   a) a pair of counterrotating turbines;
   b) an annular ring surrounding each turbine;
   c) an array of propfan blades extending from each ring; and
   d) a cowl surrounding each ring and through which the propfan blades extend, and
   e) difussion means located near the root of the propfan blades which reduces the tendency of the air to accelerate as it enters each propfan array.

4. A propulsion system according to claim 3 and further comprising vent means located forward of one or both of the propfan arrays for venting gases contained within the respective cowls into the fan stream.

5. A propulsion system according to claim 3 in which the diffusion means comprises a concavity in the surface defining the fan flow path.

6. A propulsion system according to claim 3 in which each cowl comprises
   i) a fore and an aft annular mounting ring;
   ii) a plurality of removable panels extending between the rings and providing a plurality of openings through which the propfan blades may extends.

7. A propulsion system according to claim 3 and further comprising
   f) a circular platform which is
      (i) sealed to the base region of each propfan blade;
      (ii) rotatable within the opening through which the propfan blade extends; and
      (iii) sealed to the opening to restrict the passage of gases.

* * * * *